United States Patent
Li (10) Patent No.: US 7,894,442 B2
(45) Date of Patent: Feb. 22, 2011

(54) DATA TRANSMISSION METHOD AND A SYSTEM THEREOF

(75) Inventor: Xixiang Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 148 days.

(21) Appl. No.: 12/042,485

(22) Filed: Mar. 5, 2008

(65) Prior Publication Data
US 2008/0151899 A1      Jun. 26, 2008

Related U.S. Application Data

(63) Continuation of application No. PCT/CN2007/000297, filed on Jan. 26, 2007.

(30) Foreign Application Priority Data

Jan. 27, 2006      (CN)      ................ 2006 1 0004080

(51) Int. Cl.
*H04L 12/28* (2006.01)
*H04L 12/56* (2006.01)
(52) U.S. Cl. .................. 370/393; 370/351; 370/389; 370/392
(58) Field of Classification Search .............. 370/392, 370/389, 393, 351
See application file for complete search history.

(56) References Cited

U.S. PATENT DOCUMENTS 3,729,712 A * 4/1973 Glassman ............... 360/72.1
6,574,215 B2   6/2003 Hummel et al.
6,591,383 B1 * 7/2003 Michel et al. ............. 714/704
6,850,530 B1 * 2/2005 Waclawsky et al. ....... 370/401

(Continued)

FOREIGN PATENT DOCUMENTS

CN      1286550      3/2001

(Continued)

OTHER PUBLICATIONS

Office Action issued in corresponding Chinese Patent Application No. 2006100040803; dated Jun. 5, 2009.

(Continued)

*Primary Examiner*—Ayaz R Sheikh
*Assistant Examiner*—Tarell Hampton
(74) *Attorney, Agent, or Firm*—Brinks Hofer Gilson & Lione (57) ABSTRACT

In a data transmission system, a route information header RIH is added in each transmitted data packet and includes the route information of the data packet in a network. A network element receives the data packet, reads out route information which is needed by a node, and transmits the data packet after the network element reads out the route information which is needed by the node. the route information can be deleted from RIH, and a verification field of the RIH can be updated. The system includes an existing network and a data relay network device, and a data encapsulation protocol of the relay network device for the RIH is associated with the service layer of the original data encapsulation protocol, or is associated with the same layer as an original data encapsulation protocol. The original data encapsulation protocol is used for transmitting in a data relay network device supporting RIH, or is terminated at a boundary of the data relay device at network.

16 Claims, 4 Drawing Sheets

U.S. PATENT DOCUMENTS

| | | |
|---|---|---|
| 6,925,092 B1 * | 8/2005 | Derks et al. ............... 370/465 |
| 6,947,421 B1 | 9/2005 | Glingener et al. |
| 7,362,744 B2 * | 4/2008 | Basso et al. ............... 370/351 |
| 2003/0185215 A1 | 10/2003 | Wright et al. |
| 2004/0088389 A1 * | 5/2004 | Shah ....................... 709/221 |
| 2004/0141468 A1 * | 7/2004 | Christensen et al. ...... 370/252 |
| 2005/0027881 A1 | 2/2005 | Figueira et al. |
| 2005/0036452 A1 * | 2/2005 | Banerjee et al. ........... 370/252 |
| 2006/0025113 A1 * | 2/2006 | Nguyen et al. ........... 455/412.1 |
| 2006/0083229 A1 * | 4/2006 | Jordan et al. .............. 370/389 |
| 2006/0143300 A1 * | 6/2006 | See et al. .................. 709/227 |
| 2008/0095138 A1 * | 4/2008 | Wu et al. ................... 370/342 |
| 2009/0122801 A1 * | 5/2009 | Chang ...................... 370/395.53 |
| 2009/0186965 A1 * | 7/2009 | Rodgers et al. ............. 524/52 |

FOREIGN PATENT DOCUMENTS

| | | |
|---|---|---|
| CN | 1310900 | 8/2001 |
| CN | 1310900 A | 8/2001 |
| CN | 1578227 A | 2/2005 |
| CN | 100571202 C | 12/2009 |
| WO | 2004/051957 A1 | 6/2004 |
| WO | 2004051957 | 6/2004 |

OTHER PUBLICATIONS

International Preliminary Report on Patentability issued in corresponding PCT Application No. PCT/CN2007/000297; issued Jul. 29, 2008.

* cited by examiner

DATA TRANSMISSION METHOD AND A SYSTEM THEREOF

CROSS REFERENCE TO RELATED APPLICATIONS

This application is a Continuation of PCT/CN2007/000297 filed Jan. 26, 2007, and claims the benefit of Chinese Patent Application No. 200610004080.3 filed on Jan. 27, 2006, both of which are incorporated by reference in their entireties herein. The PCT application published in Chinese as WO2007/085198 A1.

FIELD OF THE INVENTION

The present invention relates to data communication technologies and in particular to a method and system for data transmission.

BACKGROUND OF THE INVENTION

With the development of communication technologies, transmission networks have evolved quickly from the era of Synchronous Digital Hierarchy (SDH) to the era of packet-based technologies. For packet-based technologies, a forwarding table is typically maintained at each network element, e.g. Ethernet, Multiple Protocol Label Switching (MPLS). A forwarding table for Ethernet is indexed by a Destination Address (DA) or by DA+VLAN-ID (Virtual Local Area Network Identification) in the case that a VLAN ID is present. Due to the discreteness of Media Access Control Layer (MAC) addresses, a hash algorithm is required to create and search the forwarding table. Whether the hash algorithm is superior or inferior depends upon selecting of a hash formula and adjusting of the size of the forwarding table. The algorithm is of a constant complexity in most cases, and of a relatively high complexity in the case of a failure in hitting, and may search throughout the forwarding table in a worst case. The label space of MPLS is 1M, and practically, not all labels will be used for a network element, so that in a system with limited memory, the hash algorithm can be equally used to create and search the forwarding table. The size of a hash table determines the efficiency of the hash algorithm, but adds to the overhead of the system. Such a mechanism has been used so far. Centralized data switching based upon a forwarding table for packets has direct influence upon the efficiency of data forwarding in a communication network and the complexity of system processing, which limits increasing of the switching capacity of a network element and raising of the throughput of a port.

In view of the above, an important approach for improving the efficiency of packet switching is to seek an appropriate method which can reduce the complexity of a searching algorithm for data packet forwarding to a constant value while not occupying too many system resources.

At present, there has been provided in the prior art a method and device for direct switching of frames containing destination information, as disclosed in publication No. CN 20050027881, which presents the following disclosure:

1) Information on egress ports of respective network elements, which have been passed, is stored in an Ethernet frame, and forwarding by each hop is based upon the information on egress ports, which is read from the data frame. In other words, this method does not require forwarding according to a MAC address. The information on egress ports can be encapsulated into a part of bits in the MAC address, thus forming a Local MAC Address (LMA). For a large Ethernet switch, a sub-domain can be used to represent an internal forwarding element.

2) Upon receipt of the Ethernet frame, an intermediate network element reads from the LMA an egress port to be processed by the present network element, and efficiently forwards the frame through the egress port without an access to a Forwarding Database (FDB).

3) Further more, a location processing server is also required, which stores and allocates IP and MAC addresses, and generates and resolves an LMA in response to a request of a local Address Resolution Protocol (ARP) within this local domain.

However, the inventors have studied this solution and found that there are still the following drawbacks:

1) Due to limited bits available to Destination Addresses of a Media Access Control layer (MAC DAs), data frames can not be transmitted effectively in a large network, and if there are a large number of nodes, then an embedded routing table may exceed the number of available bits of MAC DAs.

2) It is difficult to determine the number of ports of network nodes because there may be thousands of ports present in a large Ethernet switch, which may also cause the embedded routing table to exceed the number of available bits of MAC DAs when being in use.

3) The generation of a local LMA is defined because an LMA is generated by the ARP protocol resolving an IP address, which involves no other implementation methods, such as self-learning of Layer-2 protocol Ethernet.

4) Neither application in a network nor intercommunication with a MAC forwarding mechanism for a conventional Ethernet switch has been involved.

SUMMARY OF THE INVENTION

Embodiments of the present invention provide a method and system for data transmission to achieve fast switching of data frames in a large network.

An embodiment of the invention provides a method for data transmission including:

adding a Routing Information Header (RIH) in each transmitted data packet, the RIH containing routing information of the data packet in a network;

reading, by a network element, routing information required for a present network node from the RIH upon receipt of a data packet with the RIH; and transmitting the data packet in accordance with the read routing information.

Another embodiment of the invention provides a system for data transmission including an existing network and a data relaying network device, wherein a data encapsulation protocol supporting an RIH, for the data relaying network device, is of a service layer of an original data encapsulation protocol in the existing network, and the both protocols constitute a client/server relationship; at an outer layer of an original data packet, the RIH is encapsulated as being a forwarding criterion for each node along a link; and an original encapsulation format, including various signaling and protocols, is transmitted transparently through the data relaying network device supporting the RIH.

Still another embodiment of the invention provides a system for data transmission including an existing network and a data relaying network device, wherein a data encapsulation protocol supporting an RIH, for the data relaying network device, can be of the same layer as an original data encapsulation protocol, and both protocols constitute a peer-to-peer relationship. The RIH is inserted into an original data packet encapsulation. An original encapsulation format, including various signaling and protocols, is terminated on the data relaying network device at a border of a network; and intercommunication between networks is enabled through a conversion between two mechanisms under a control of management-plane or end-to-end upper-layer protocols or signaling.

The data relaying device constitutes by itself a management domain in which topology discovery and routing selection protocols and various control-signaling supporting the Routing Information Table (RIT) are operated.

Obviously from the embodiments of the invention, in a data transmission network, the number of nodes through which a service passes will be limited under a strict management and control. For a typical telecommunication network, the service goes through an access node at an entrance to the network of a service provider, then goes through a service convergence point, and reaches a backbone point at which the service is subject to remote transmission or local service switching. Then, the service goes to another end of the service in a downlink in an opposite way. Due to this procedure, the RIT can be 10 table items in size, and the RIH can be of 8~24 bytes. Such an overhead is totally acceptable in comparison with an Ethernet data packet allowance for a maximum size of 1.5K or an IP/MPLS packet allowance for a larger size. If a network with such an architecture including routing information is only a partial network through which an end-to-end service goes, the RIH may gain a higher relative bandwidth efficiency, and the fast switching for data transmission is achieved.

BRIEF DESCRIPTIONS OF THE DRAWINGS

The invention will become more readily apparent from the Detailed Description of the Invention, which proceeds with reference to the drawings, in which.

DETAILED DESCRIPTIONS OF THE EMBODIMENTS

Embodiments of the present invention present a new architecture and an implementation mechanism thereof in a communication network for data transmission, adding in each transmitted data packet a Routing Information Header (RIH) containing routing information of the data packet in the network, so that fast switching for data transmission can be achieved.

The invention is further described as follows with reference to the drawings and the embodiments.

Figure 1:
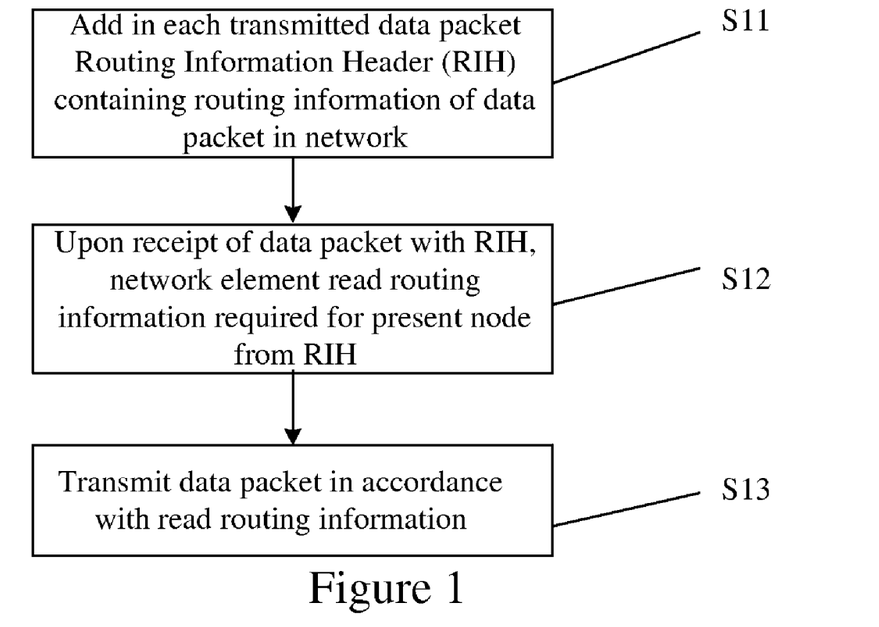
FIG. 1 is a flow chart of a method for data transmission according to an embodiment of the invention.

Referring to FIG. 1, a flow chart of a method for data transmission according to an embodiment of the invention is shown. The method includes the following steps.

In step S11, an RIH is added in each transmitted data packet, wherein the RIH contains routing information of the data packet in a network.

In step S12, upon receipt of a data packet with the RIH, a network element reads routing information required for the present network node from the RIH.

In step S13, the data packet is transmitted in accordance with the read routing information.

In other words, the invention as shown with reference to FIG. 1 adds in each transmitted data packet a RIH containing routing information of the data packet in a network. Upon receipt of a data packet with the RIH, a network element reads routing information required for the present network node from the RIH; and the network element transmits the data packet in accordance with the read routing information, thus accomplishing fast switching for data transmission.

Figure 2:
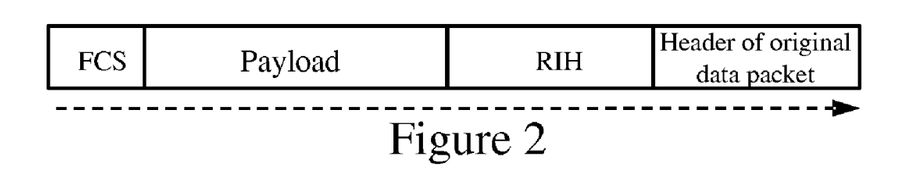
FIG. 2 is a structural diagram of an encapsulated data packet based upon an RIH according to an embodiment of the invention, where "header of the original data packet" is the preamble part of the data packet and/or MAC address (in Ethernet) for physically compatibility with legacy networks.

Further referring to FIG. 2, a structural diagram of an encapsulated data packet based upon an RIH according to an embodiment of the invention is shown. Components and contents of an original data packet are reserved in this structure without modification, and only an RIH is added, in order to keep the original identifiers of a service and be compatible with the existing networks.

Figure 3:
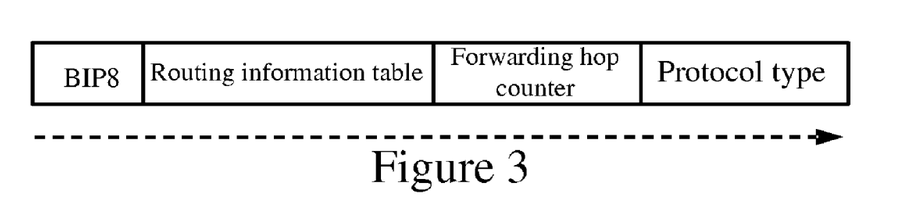
FIG. 3 is a structural diagram of a RIH according to an embodiment of the invention.

The structure of the RIH is shown in FIG. 3. The RIH includes at least a routing information field, and may further include a protocol type field, a forwarding-hop-count field, and/or a bit check field BIP8.

Referring to FIG. 2 and FIG. 3, the processing procedure for the system according to an embodiment of the invention is as follows.

Upon receipt of a data packet which could be an Ethernet frame, an MPLS packet, an Asynchronous Transfer Mode (ATM) information element, or a frame-relayed segment, etc. with the RIH, the network element reads information on an egress port, which can, for example, be determined in accordance with a protocol or signaling, or be configured manually, that is required for the present network node from the RIH. The data packet is then transmitted through the read egress port. In this procedure, a series of processing steps are performed on the RIH, including a Frame Check Sequence (FCS), where after updating the RIT, the network element regenerates and puts a BIP8 of the RIH into the check field. Then, it is determined in accordance with a system requirement whether to check the entire data packet with respect to the FCS or the like. The FCS field is updated upon completion of the check.

Finally, the data packet is forwarded to the egress port of the present network element in accordance with a read egress port number.

Figure 4:
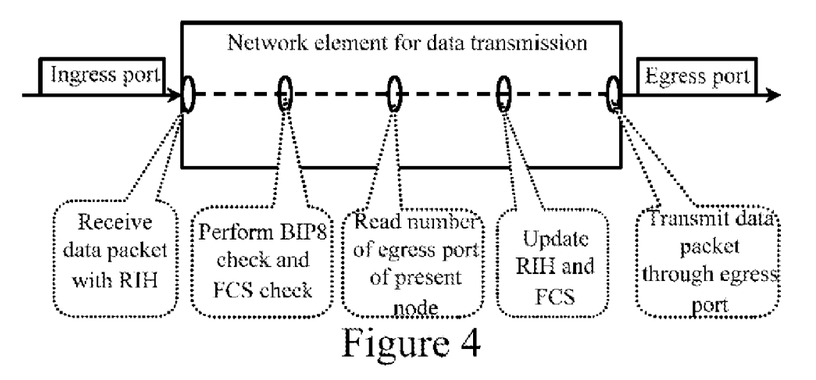
FIG. 4 is a schematic diagram of a procedure for processing a data packet with an RIH according to an embodiment of the invention.

Referring to FIG. 4, a schematic diagram of a procedure for processing a data packet with an RIH according to an embodiment of the invention is shown. As shown in FIG. 4, upon receipt of a data packet, the present network node determines whether the data packet is one carrying an RIH in accordance with a protocol type. If so, then a check is required on the BIP8 of the RIH, in other words, a 8-bit exclusive-or (XOR) operation is performed on bytes in the RIH other than the BIP field to obtain a 8-bit value. If this value is equal to a value in the BIP check field, then it indicates that data in the RIH is correct, otherwise an error occurs. The BIP8 check of the RIH can correct a 1-bit error, and if the error correction fails, then the frame is discarded. Also if the system requires an FCS check, then the FCS check shall be performed on the entire frame. If the check fails, the frame is discarded; otherwise, the information on the egress port of the present network node is read from the RIT of the data packet with the RIH. After the information on the egress port is read, the read routing information is removed from the RIH, which is updated in terms of four bytes, and the check field in the RIH or in the entire data packet is updated. After the RIH is updated, a BIP8 check shall be performed, with a check result written into the bit check field. The BIP8 check of the RIH can correct a 1-bit error.

The network element of FIG. 4 checks a Hop-Counter (HC) field of the RIH, and if the HC is zero, then it indicates that no termination point can be found after processing has been performed on the data packet with respect to all hops, and thus the packet is discarded.

For a normal data packet with an RIH, the network element reads the information on the egress port of the present network node from the RIT of the RIH, and transmits the data packet. Also, the HC field of the RIH is decremented, and the read information of the present network node is removed from the RIH. Here, after the information on the egress port of the present network node has been read, the data packet is transmitted to the egress port. Alternatively, the data packet can be transmitted to the egress port after a check of the entire data packet.

Figure 5:
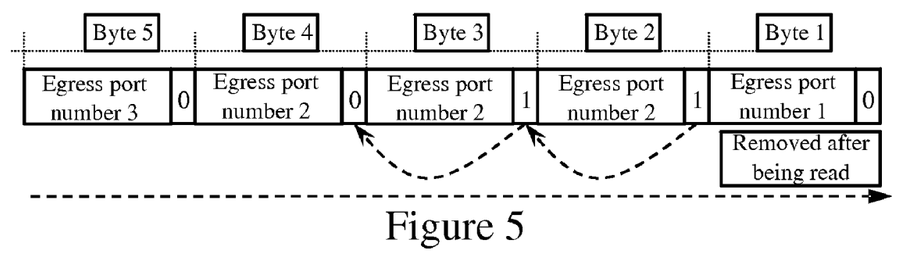
FIG. 5 is a general structural diagram of a RIT according to an embodiment of the invention.

Further referring to FIG. 5, a general structural diagram of an RIT according to an embodiment of the invention is shown. As shown in FIG. 5, the RIT is formed in byte units, and a bit in the byte is used as a flag indicative of whether an information item is ended. For instance, the first bit in the byte can be used as the flag indicative of an end of an information item. In the case that a port number of a node of a network element in the routing information field is too large, then the port number can be represented by a combination of a plurality of bytes, and a bit in the byte can be used as a flag indicative of whether this byte is combined with the next byte. The bit used as a flag indicative of whether a byte is combined with the next byte can be 0 or 1, where 0 indicates that this single byte already represents an egress port number of the network element, or that the byte is the end byte of the bytes combined to represent the egress port number, and 1 indicates that bits of this byte (e.g. 7 bits of this byte) shall be combined with bits of the next byte (7 bits of the next byte) to represent an egress port number of the network element.

The RIH is structured with a variable length, which is an integer multiple of 4 bytes. Upon an initial configuration and when a table item of the RIH is removed for each hop, full-zero bytes can be filled at the front of the table item for a complement, where the number of the full-zero bytes to be filled can be calculated from a length of the removed table item and the number of bytes filled initially.

In a data transmission network, the number of nodes through which a service goes will be limited under a strict management and control. For a typical telecommunication network, the service goes through an access node at an entrance to the network of a service provider, then goes through a service convergence point, and reaches a backbone point at which the service is subject to remote transmission or local service switching. Then, the service goes to another end of the service in a downlink in an opposite way. Due to this procedure, the RIT can be 10 table items in size, and the number of bytes occupied by the RIH can be 8~24 bytes. Such overhead is totally acceptable in comparison with an Ethernet data packet allowance for a maximum size of 1.5K or an IP/MPLS packet allowance for a larger size. In a practical application, if a network with an architecture including routing information according to the invention is only a partial network through which an end-to-end service goes, then the RIH can gain a higher relative bandwidth efficiency.

A device provided with the above functions can be called a Data Repeater (DR), which can identify a service in accordance with an original service identifier, and establish a protective relationship with a backup service.

Figure 6:
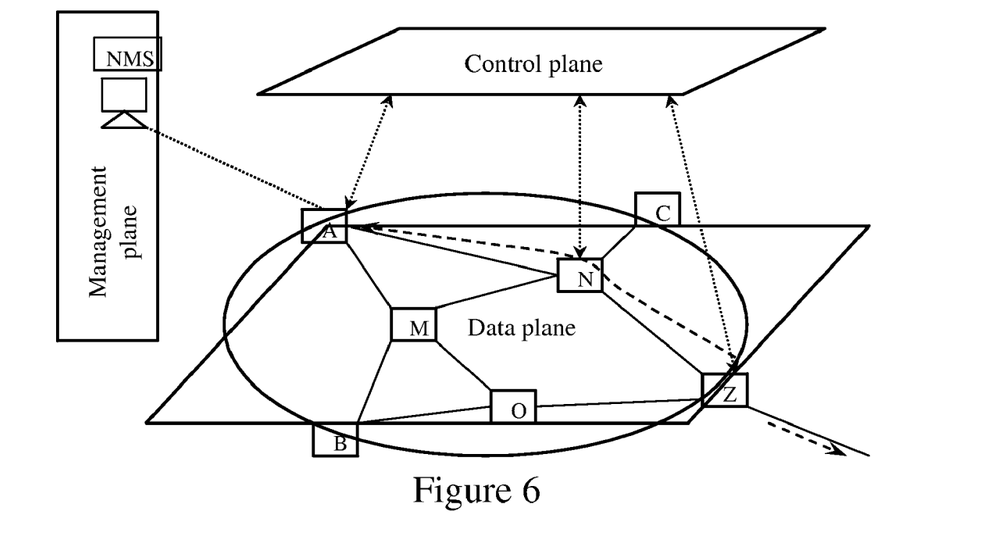
FIG. 6 is a schematic diagram of RIH generation according to an embodiment of the invention.

Further referring to FIG. 6, a schematic diagram of RIH generation according to an embodiment of the invention is shown. A service over a DR is provided with an explicit and determined route, and its RIH can be generated through the following three methods but not limited to herein.

According to the first method, an RIH can be generated by a management plane NMS, which takes charge of a network topology or is implemented according to a plan, at an entrance node of a network (e.g. a node A in FIG. 6) in accordance with a configuration of a network administrator.

According to the second method, within a data plane, routing information, i.e. numbers of egress ports on the way, can be discovered through self-learning and registration in accordance with a protocol, and then can be gathered at each entrance network element located at an edge of a network to form an RIT set. The entrance network element determines a corresponding RIT in accordance with a routing analysis of an accessing service, such as corresponding analyses of an IP address and a MAC address by the ARP protocol, and thus generates and adds an RIH into data packets of the accessing service.

According to the third method, a network topology is reported to a control plane through a topology discovery protocol operating over a network, a routing protocol is operated over the control plane based on the network topology, and information of the egress ports across the connection in the respective network nodes is obtained, thus obtaining and issuing an RIH to a data plane; or within the control plane, a discovery of a topology of the entire network is performed through a topology discovery protocol, a routing analysis of an accessing service is performed in accordance with a routing protocol, an RIT and further an RIH are generated with respect to the discovered network topology, and the RIH is added into data packets of the accessing service for transmission.

For a network level of multi-layer convergence, an uplink port can be appointed by a network operator, and thus the implementation of the topology discovery and the routing selection protocol can be simplified.

Due to the special mechanism requirement of the transmission system according to the embodiments of the invention, existing networks can not support such processing of the mechanism, and thus devices supporting the RIH architecture need to be networked separately. Because the RIH brings an incremental change to original data packets, a network constituting of such devices can be compatible with the existing networks.

Figure 7:
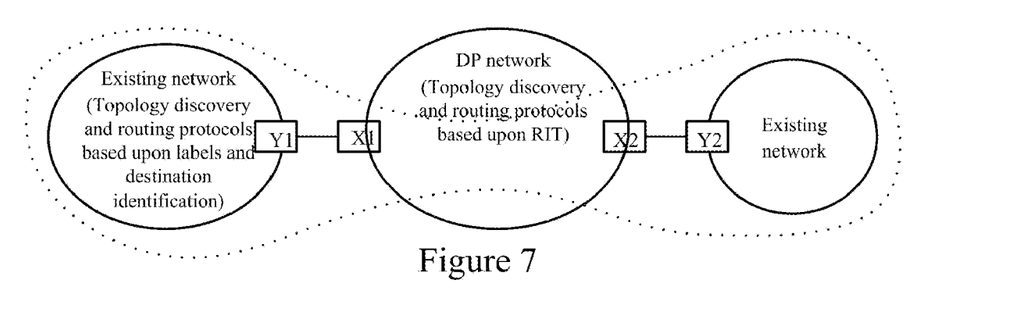
FIG. 7 is a schematic diagram of network intercommunication using a layer model in the system according to an embodiment of the invention.

Further referring to FIG. 7, a schematic diagram of network intercommunication using a layer model according to an embodiment of the invention is shown. As shown, with respect to a protocol level, a data encapsulation protocol supporting an RIH can be of a service layer of an original data encapsulation protocol, and the both protocols can constitute a client/server relationship. In other words, at an outer layer of an original data packet, an RIH can be encapsulated as being a forwarding criterion for each node along a link. An original encapsulation format, including various signaling and protocols, can be transmitted transparently through a DR device supporting an RIH. As shown in FIG. 7, an existing network protocol is transmitted transparently at X1 and X2.

Figure 8:
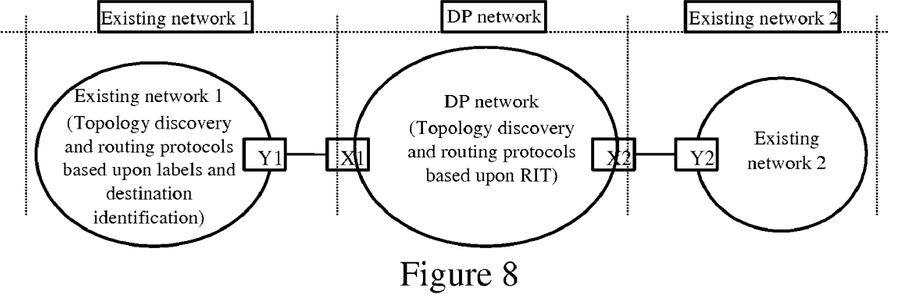
FIG. 8 is a schematic diagram of network intercommunication using a peer-to-peer model in the system according to an embodiment of the invention.

Further referring to FIG. 8, a schematic diagram of network intercommunication using a peer-to-peer model according to an embodiment of the invention is shown. As shown, with respect to a protocol level, a data encapsulation protocol supporting an RIH can be of the same layer as an original data encapsulation protocol, and the both protocols constitute a peer-to-peer relationship. An original encapsulation format can be terminated on a DR device at a border of a network, and for a new data encapsulation format, an RIH can be inserted in the original encapsulation format. The new data encapsulation format also includes various signaling and protocols. As illustrated in FIG. 8, at X1 and X2, an existing network protocol is terminated, and a DR network constitutes by itself a management domain in which topology discovery and routing selection protocols and various control-signaling supporting an RIT can be operated. Intercommunication between the networks requires a conversion between the two mechanisms, and can be managed in accordance with management-plane or end-to-end upper-layer protocols/signaling.

The above descriptions are merely illustrative of the preferred embodiments of the invention, and are not intended to limit the invention, a scope of which shall be defined only by the accompanying claims. Any modification, improvement or equivalent substitution made without departing from the spirit and scope of the invention shall be encompassed in the claimed scope of the invention.

What is claimed is:

1. A method for data transmission, comprising the steps of:
    adding a Routing Information Header, RIH, in a transmitted data packet, the RIH containing a Routing Information Table, RIT;
    after receiving, by a network element, the data packet with the RIH, reading information on an egress port of the present network element from the RIT of the RIH; and transmitting the data packet through the read egress port;
    wherein:
    the RIH is structured with a variable length, which is an positive integer multiple of 4 bytes; and
    upon an initial configuration and when a table item of the routing information header is removed for each hop, full-zero bytes are filled at the front of the table item for a complement, where the number of the full-zero bytes to be filled is calculated from a length of the removed table item and the number of bytes filled initially.

2. The method for data transmission according to claim 1, wherein the transmitted data packet comprises one of an Ethernet frame, a Multiple Protocol Label Switching data packet, an Asynchronous Transfer Mode information element, and a frame-relayed segment.

3. The method for data transmission according to claim 1, wherein the RIH comprises a routing information field.

4. The method for data transmission according to claim 3, wherein the RIH further comprises a protocol type field, a forwarding-hop-count field, and/or a bit check field.

5. The method for data transmission according to claim 3, wherein the routing information field data grouped in units of bytes and a bit in each byte is used as a flag indicative of whether an information item is ended.

6. The method for data transmission according to claim 5, wherein the first bit in the byte is used as a flag indicating an end of an information item.

7. The method for data transmission according to claim 5, wherein a combination of a plurality of bytes indicates whether a port number of a node of the network element in the routing information field is too large, and a bit in the byte is used as a flag indicating whether the byte is combined with the next byte.

8. The method for data transmission according to claim 7, wherein a value of the bit is used as a flag indicating whether the byte is combined with the next byte, where a value of 0 indicates that the single byte represents an egress port number of the network element, or that the byte is the end byte of the bytes combined to represent the egress port number, and a value of 1 indicates that bits of the byte shall be combined with bits of the next byte to represent an egress port number of the network element.

9. The method for data transmission according to claim 1, wherein:
    the routing information comprises information on an egress port of respective network nodes, and the network element transmits the data packet through egress ports of respective network nodes.

10. The method for data transmission according to claim 9, wherein the information on the egress port of the respective network nodes is determined upon a protocol or signaling, or is configured manually.

11. The method for data transmission according to claim 1, wherein the step of reading routing information required for the present network node from the RIH further comprises the steps of:
    after receiving the data packet, determining, by the network element, whether the data packet contains an RIH;
    if the data packet contains an RIH, reading information on the egress port of the present network node from a Routing Information Table (RIT) of the data packet containing the RIH; and
    removing the read routing information from the RIH, and updating the RIH.

12. The method for data transmission according to claim 11, further comprising the steps of:
    after the RIH is updated, performing a BIP8 check, and writing a check result into the bit check field, where the BIP8 check of the RIH corrects a 1-bit error.

13. The method for data transmission according to claim 1, wherein the step of transmitting of the data packet in accordance with the read routing information further comprises the steps of:
    transmitting the data packet through a read egress port;
    decrementing a Hop-Counter, HC, field of the RIH; and
    removing the read information of the present network node from the RIH.

14. The method for data transmission according to claim 13, wherein the transmission of the data packet comprises transmitting the data packet to the egress port after information on the egress port of the present network element is read, or transmitting the data packet to the egress port after a check is performed on the entire data packet.

15. The method for data transmission according to claim 1, wherein the RIH is generated through any of the following:
    the RIH is generated by a management plane, which takes charge of a network topology or is implemented as per a plan, at an entrance node of a network in accordance with a configuration of a network administrator;
    within a data plane, routing information is discovered through self-learning and registration in accordance with a protocol, and then is gathered at each entrance network element located at an edge of a network to form a RIT set; and the entrance network element determines a corresponding RIT in accordance with a routing analysis of an accessing service, and then generates and adds the RIH into the data packets of the accessing service;

a network topology is reported to a control plane through a topology discovery protocol operating over a network, a routing protocol is operated over the control plane based on the network topology, and information of the egress ports across the connection in the respective network nodes is obtained, thus obtaining and issuing an RIH to a data plane; or within a control plane, a discovery of a topology of an entire network is performed through a protocol discovered by a topology discovery protocol, a routing analysis of an accessing service is performed in accordance with a routing protocol, an RIT and further the RIH are generated with respect to the discovered network topology, and the RIH is added into the data packet of the accessing service for transmission.

16. A network element for data transmission, comprising:
a processor configured to implement a method comprising:
receiving a data packet with a Routing Information Header RIH, the RIH containing a Routing Information Table, RIT;
reading information on the egress port of the present network element from the RIT of the RIH; and
transmitting the data packet through the read egress port;
wherein:
the RIH is structured with a variable length, which is an positive integer multiple of 4 bytes; and
upon an initial configuration and when a table item of the routing information header is removed for each hop, full-zero bytes are filled at the front of the table item for a complement, where the number of the full-zero bytes to be filled is calculated from a length of the removed table item and the number of bytes filled initially.

* * * * *